United States Patent [19]

Sciarretta

[11] Patent Number: 4,975,784
[45] Date of Patent: Dec. 4, 1990

[54] METHOD FOR GRAVING PRINTING FORMS

[75] Inventor: Benito Sciarretta, Turin, Italy

[73] Assignee: Dr. Ing. Rudolf Hell GmbH, Fed. Rep. of Germany

[21] Appl. No.: 246,160

[22] Filed: Mar. 23, 1981

[30] Foreign Application Priority Data

Mar. 21, 1980 [DE] Fed. Rep. of Germany ....... 3010880

[51] Int. Cl.$^5$ ............................................. H04F 1/46
[52] U.S. Cl. .................................. 358/447; 358/461; 358/474
[58] Field of Search ................... 358/75, 80, 285, 280, 358/283, 284, 293, 294, 166, 447, 454, 461, 474, 480

[56] References Cited

U.S. PATENT DOCUMENTS

| | | |
|---|---|---|
| 2,543,393 | 2/1951 | Wheldon . |
| 2,691,696 | 10/1954 | Yule ........................................ 358/294 |
| 2,962,548 | 11/1960 | Taudt . |
| 2,972,012 | 2/1961 | Farber .................................... 358/80 |
| 3,024,111 | 3/1962 | Sportelli . |
| 3,582,549 | 6/1971 | Taudt et al. . |
| 4,065,788 | 12/1977 | Meier et al. ........................... 358/166 |
| 4,279,003 | 7/1981 | Schulz .................................... 358/280 |

FOREIGN PATENT DOCUMENTS 706688 4/1954 United Kingdom .
706689 4/1954 United Kingdom .

Primary Examiner—Joseph A. Orsino
Attorney, Agent, or Firm—Hill, Van Santen, Steadman & Simpson

[57] ABSTRACT

A method for graving printing forms using rastered masters by means of a scanning system which can be adjusted in focus. The signal supplied by the scanner after processing in an electronic computer controls a graving system so as to scan rastered originals. The scanning system is placed out of focus and the loss of image information caused by placing it out-of-focus is compensated by means of an electronic out-of-focus mask.

4 Claims, 1 Drawing Sheet

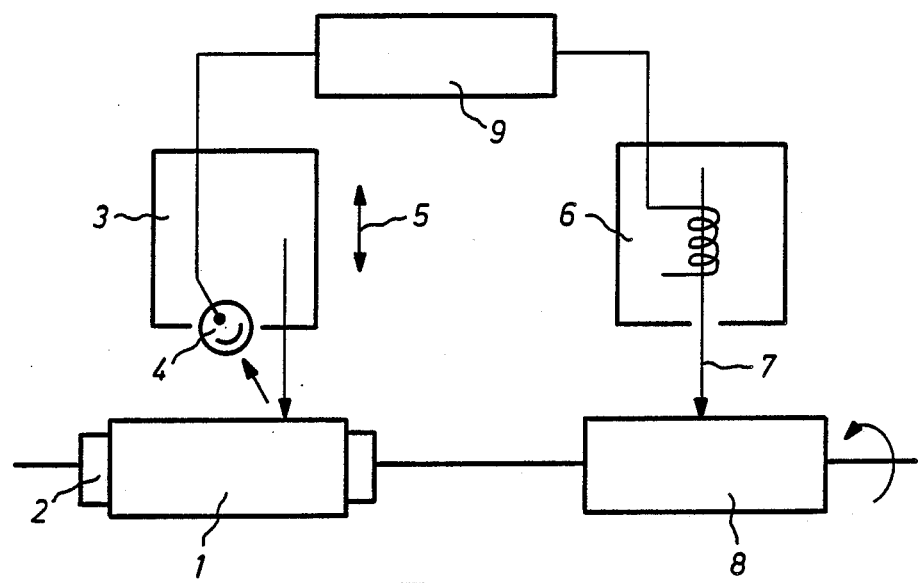
Fig. 1
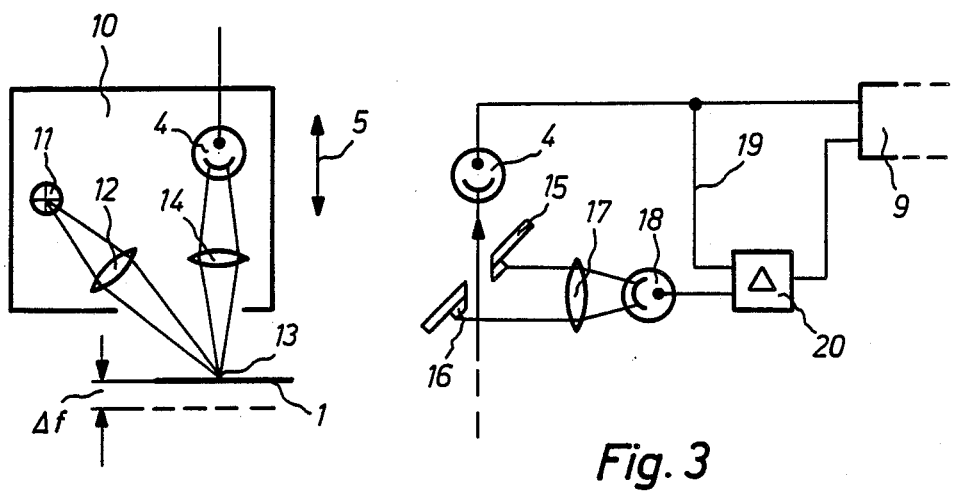
Fig. 2
Fig. 3

METHOD FOR GRAVING PRINTING FORMS

BACKGROUND OF THE INVENTION

1. Field of the Invention

The present invention relates in general to a method for graving printing forms and in particular the invention relates to a method for graving printing forms for rotary printing machines in which rastered masters are employed for scanning.

2. Description of the Prior Art

The use of a rastered original for the graving of a rotary printing form has been disclosed in U.S. Pat. Nos. 3,582,549; 2,543,393 and 3,024,111 and in British Patent Nos. 706,688 and 706,689. These patents disclose methods for producing the printing form in a chemical manner.

There are also electro-mechanical methods known for producing printing forms which comprise the following steps:

(a) opto-electronically scanning the original by means of an optical illumination and scanning system which includes means for placing the original into focus;

(b) conversion of the light signals obtained during scanning of the original into electrical signals which reproduce the intensity of the light signal and then processing the electrical signals in an electronic computer;

(c) the graving of the printing form with a graving tool which is controlled by the electrical signals thus produced.

This method has long been employed in the graving machines of the "Helio-Klischograph" of the assignee of the present application. Unrastered color separation, also called Opals, which have been specifically transferred to opaque, reflecting material are scanned. The production of said Opals is expensive and involved a great deal of time and it is thus desirable to avoid production of opals.

Instead of scanning the opals, the unrastered color separations, it would be much simpler to scan color separations which have already been rastered as is done in offset printing or other printing methods in which rastered color separations are utilized. Such color separations can be produced much cheaper than the opals which have been used up to this time and exist if the original has already been duplicated as, for example, during offset printing. If, however, one uses the rastered color separations in the prior art method instead of the unrastered originals then a moiré effect which results in unacceptable printing occurs and the moiré results from the superimposition of the raster of the scanned original sheet with the raster with which the graving tool graves the printing form.

SUMMARY OF THE INVENTION

It is an object of the present invention to provide a method which makes it possible to also scan rastered originals during scanning within an electro-mechanical graving machine for the production of printing forms.

The present invention has an object to provide a method for graving a printing form which utilizes an original which consists of a rastered master as can be normally obtained for example from films which are used in offset printing or by photocopying and wherein the method comprises a combination of the following steps:

(a) opto-electronically scanning of the original by using illumination and scanning system which allows the original to be placed out of focus;

(b) the transformation of the light signal obtained from the original scanning into an electrical signal which follows the light signal and the use of electronic processing of the electrical signal with an electronic computer;

(c) electronic out-of-focusing masking as described, for example, in U.S. Pat. No. 2,962,548;

(d) graving of the printing form by means of a graving tool which is controlled by the electrical signal obtained.

The additional method steps as compared to normal graving are the defocusing of the illumination and scanning system and the out-of-focus masking.

When the scanning of the rastered original is accomplished with the optical system out-of-focus and the loss of image information occurs, it can be compensated by the use of an out-of-focus mask which eliminates the Moiré effect.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 illustrates the invention;

FIG. 2 is an enlarge detail illustration of the illumination and scanning system; and FIG. 3 is an example of a system for increasing the contrast by utilizing electronic out-of-focus masking.

DESCRIPTION OF THE PREFERRED EMBODIMENTS

FIG. 1 illustrates the invention which comprises a graving machine for the production of rotogravure forms as is utilized for example in "Helio-Klischograph" machines manufactured by the assignee of the present application. Although the machine is schematically illustrated in FIG. 1, its format and drive mechanism are described in greater detail in U.S. Pat. No. 3,582,549 which is hereby incorporated by reference. The machine and the method according to which the machine functions are described in U.S. Pat. No. 3,582,549 and such devices have been commercially available for a long time and persons skilled in the art to which the present invention pertains are familiar with the details of such machine.

An original 1 which consists of a rastered master which is normally employed in offset printing or in batch type technology is mounted on a scanning cylinder 2 which rotates around its longitudinal axis at a constant speed. An optical illuminating and scanning system 3 optically scans the original 1. The optical system 3 can be moved relative to the master 1 by known means so as to place the original 1 into focus. A photo-transducer 4 which might, for example, be a photomultiplier receives the light reflected from the original 1 and transforms it into an electrical signal which varies as the intensity of the reflected light.

An electronic processing unit 9 receives the output of the photo-transducer 4 and provides an output to the electromagnetic control unit 6 which drives the graving tool 7. The graving tool 7 cuts cups or depressions on a rotating copper cylinder 8 and the depth of the graving of the graving tool 7 depends on the amplitude of the electrical signal received by the control unit 6 and thus on the intensity of the reflected light which is received by the photo-transducer 4. The actual printing form is obtained by the graving and the rotating copper cylinder 8 which is mounted on the same axis as the scanning cylinder 2 and rotates at the same speed as the scanning cylinder 2 and the graving tool 7 graves the cups into the copper surface of the cylinder and the cups are used in printing and accept the ink and transfer it to paper for making reproductions.

When the scanning system 3 is precisely focused on the original, the superimposition of the grid of the original 1 with the corresponding grid of the graving tool produces the previously mentioned Moiré effect which is undesirable.

According to the present invention, an additional step is utilized wherein the original is defocused before scanning the original 1. Thus, the optical system according to the present invention is placed out of focus but in the proximity of the exact focus according to the original employed. In other words, in accordance with the raster size of the original.

With the machine such as the "Helio-Klischograph" manufactured by the assignee of the present application, it has been discovered that a preferred amount of defocusing of the system from the precise focus position is preferably about 1.25 mm or in a particular example was 1.255 mm. In such machines, this length corresponds to approximately 1¼ turns of the focus adjustment setting screw which is standard on such machines.

Such focus adjusting setting screws are well known to those skilled in the art who are familiar with the "Helio-Klischograph" machines. The double arrow 5 in FIGS. 1 and 2 indicates that the scanning head can be moved relative to the original 1 and the scanning cylinder 2. It is to be realized that the defocusing can occur by moving the scanning head or alternatively the defocusing can be accomplished by defocusing the optical system such as, for example, by moving a lens as for example in a telescope.

It is to be realized that the invention can be utilized with known graving machines such as are extensively described in U.S. Pat. No. 4,013,829 of the assignee of the present application of which disclosure is hereby incorporated by reference. The technical details of such graving machines are known to those skilled in the art because such machines have been in actual use for many years and such machines are described for example in U.S. Pat. No. 3,582,549 as well as U.S. Pat. No. 4,013,829 and the details of the graving unit and the electronic processing is not described in detail in this application for this reason.

FIG. 2 illustrates an illuminating and scanning system 3 in detail. A light source 11 is focused with a lens 12 onto the master 1 in the focal plane 13. The light source 11 and lens 12 are mounted in the housing 10 of the scanning system 3 which is generally referred to as a scanning head.

In FIG. 2, the phototransducer 4 receives light which is reflected from the master through a lens 14. By defocusing the system, the advantages of the present invention results as, for example, by changing the distance of the scanning head from the master by an amount of Δf of about 1.25 mm. In addition, out of focus masking such as described in U.S. Pat. No. 2,962,548 is utilized in addition to the normal scanning so as to compensate for the loss of image information caused by the defocusing.

FIG. 3 illustrates a device for improving the contour reproductions in other words the sharpness and this apparatus can be additionally provided within the scanning head 3. The reflected light from the master 1 passes through a perforated mirror 15 which is mounted at an angle relative to the incident light between the lens 14 and the transducer 4 and the mirror is formed with mirror reflective surface 16 about the opening on the incident side of the light and the size of the mirroring 16 corresponds to the width of the environment of the scanning spot 13 which is to be scanned. The light reflected by the mirrored surface 16 passes through a lens 17 to an additional photo-transducer 18 which produces an output signal and supplies it to a differential stage 20 which also receives the output from the transducer 4 by way of lead 19 and produces a signal equal to the difference between the primary signal detected by the transducer 4 and the signal detected by the transducer 18. The differential signal from the output of the differential stage 20 is supplied to a superposition and electronic processing stage 9' which also receives the primary channel signal from the photo-transducer 4 and superimposes the output of stage 20 on the primary signal. As is disclosed in U.S. Pat. No. 2,962,548, this results in a sharper reproduced image than occurs in the original.

The rastered masters used for the present invention can be transparent raster films which are mounted on a white scanning drum or also can be photographic paper of exposed rastered masters.

The advantage of the present invention allows the scanning of rastered masters such that when rastered offset color separations exist, these can be directly scanned for the rotogravure and it is simple by means of offset press to produce a proof, in other words, a sample impression before the actual production of the rotogravure form. Thus, the present invention saves time and money in reproduction.

The invention can be advantageously utilized in rotary printing forms produced for rotogravure. When offset reproductions have previously been produced, the rastered offset color separations can be utilized for the production of the rotogravure form without further copying. Other rastered color separations whether on photographic paper, printed or on film can be directly employed for the production of the rotogravure forms without having to produce so-called Opals for scanning.

Although the invention has been described with respect to preferred embodiments, it is not to be so limited as changes and modifications can be made which are within the full intended scope of the invention as defined by the appended claims.

I claim as my invention:

1. A method for forming graving printing forms in which rastered originals are employed, comprising the following steps:
    (a) opto-electronic scanning of said original by using an illumination and scanning system which includes means for focusing and defocusing said scanning system from the exact focus on said original, and only scanning said original while said scanning system is defocused,
    (b) converting of the light received during said defocused scanning of the original into an electrical signal, (c) additionally electronically unsharp masking all the information formed during defocused scanning by said the scanning system, and
(d) graving of a printing form with a graving tool which is controlled by electrical signals produced by said scanning system signals.

2. A method according to claim 1, wherein the optical scanning system is defocused from the correct focusing position by a distance of approximately 1.255 mm.

3. The method of forming graving printed forms comprising:

(a) defocusing a scanner on an original such that the focal plane moves a known distance from said original,
(b) only scanning said original while said scanner is defocused,
(c) electrically unsharp masking all the information formed during scanning, and
(d) graving a master from the information formed during said defocused scanning and unsharp masking.

4. The method of claim 3 wherein said known distance is 1.255 mm.

* * * * *